United States Patent
Kostiza

[11] Patent Number: 5,983,753
[45] Date of Patent: Nov. 16, 1999

[54] PHASE ADJUSTING GEARS HAVING HARMONIC TYPE PLANET WHEELS

[75] Inventor: Simon Kostiza, Fussgönheim, Germany

[73] Assignee: Koenig & Bauer Aktiengesellschaft, Wurzburg, Germany

[21] Appl. No.: 09/147,414

[22] PCT Filed: Jun. 18, 1997

[86] PCT No.: PCT/DE97/01238
    § 371 Date: Dec. 21, 1998
    § 102(e) Date: Dec. 21, 1998

[87] PCT Pub. No.: WO97/49629
    PCT Pub. Date: Dec. 31, 1997

[30] Foreign Application Priority Data

Jun. 22, 1996 [DE] Germany .......................... 196 25 083

[51] Int. Cl.⁶ ................................................ B65H 45/16
[52] U.S. Cl. ........................ 74/640; 475/221; 475/338
[58] Field of Search ................ 74/640; 475/221, 475/271, 338, 339

[56] References Cited

U.S. PATENT DOCUMENTS

| | | | |
|---|---|---|---|
| 3,188,888 | 6/1965 | Zink et al. | 475/338 X |
| 3,355,789 | 12/1967 | Tesull | 475/338 X |
| 3,429,200 | 2/1969 | Green | 475/338 X |
| 4,095,323 | 6/1978 | Silvestri | 74/640 |
| 4,914,981 | 4/1990 | Hummel et al. | |
| 4,922,790 | 5/1990 | Abbott et al. | 475/271 |
| 5,000,433 | 3/1991 | Prüm et al. | |
| 5,123,300 | 6/1992 | Himmelein et al. | 475/347 X |
| 5,300,848 | 4/1994 | Huss et al. | 475/290 X |
| 5,409,430 | 4/1995 | Hashimoto et al. | 475/331 |
| 5,415,595 | 5/1995 | Nelson | 475/221 X |
| 5,676,630 | 10/1997 | Mayr . | |
| 5,697,862 | 12/1997 | Sommer | 475/339 |

FOREIGN PATENT DOCUMENTS

| | | |
|---|---|---|
| 355595 | 8/1989 | European Pat. Off. . |
| 1943579 | 12/1971 | Germany . |
| 3814927 | 12/1989 | Germany . |
| 4316352 | 11/1994 | Germany . |
| 295 03 966 U | 7/1995 | Germany . |
| 4426987 | 2/1996 | Germany . |
| 1122405 | 8/1986 | United Kingdom . |
| 2291409 | 1/1996 | United Kingdom . |

*Primary Examiner*—Khoi Q. Ta
*Attorney, Agent, or Firm*—Jones, Tullar & Cooper, P.C.

[57] ABSTRACT

A gear assembly is used to adjust the phase of a plurality of rotating driving devices, such a rotary cover cams in a collecting and folding cylinder. The plurality of rotating driving devices can be phase adjusted with respect to each other through the use of individual sets of planetary gears. The planetary gear sets are coaxially and successively arranged on a shaft.

6 Claims, 2 Drawing Sheets

PHASE ADJUSTING GEARS HAVING HARMONIC TYPE PLANET WHEELS

FIELD OF THE INVENTION

The present invention relates to gears for adjusting the phase relation of a plurality of rotating drive means.

DESCRIPTION OF THE PRIOR ART

DE-AS 19 43 579 describes a device for setting the register on offset printing presses during their operation. Here, a crown gear seated coaxially in respect to the rubber blanket cylinder meshes with a crown gear fixedly seated on the plate cylinder and with a crown gear fixedly seated on the counter-pressure cylinder.

The crown gear of the rubber cylinder constitutes a sun wheel, with which an adjustable planet wheel gear meshes. A second crown gear is rotatably seated coaxially in respect to the rubber blanket cylinder and is in operative connection via two gear wheels, which are connected with each other, fixed against relative rotation.

An intermediate gear in printing presses for the adjustment of the phase relation of the axial distribution movement of distributing rollers by means of a planet wheel gear is known from DE 38 14 927 C1.

U.S. Pat. No. 5,415,595 discloses a gear arrangement for the phase adjustment of two planet wheel gears. These two planet wheel gears are intended to minimize occurring play between the teeth.

SUMMARY OF THE INVENTION

It is an object of the present invention to provide a gear for adjusting the phase relation of a plurality of rotating drive means.

This object is attained in accordance with the present invention by providing a plurality of rotating drive means which are supported coaxially with respect to each other on a first rotating shaft. Each of these rotating drive means is driven by an associated sun gear which, in turn, is driven by a planet wheel gear. A position of engagement of each planet wheel gear with respect to its associated sun gear can be varied. This will adjust the phase relationship between the rotating drive means. The planet wheel gears are arranged coaxially on a second shaft which is parallel with the first rotating shaft.

The advantages which can be attained by means of the present invention reside, in particular, in that an unlimited phase adjustment of, for example, rotating radial cover cams becomes possible. This phase adjustment can be performed continuously and while the gear is turning.

Access to a cylinder journal is made possible by means of arranging the planet wheel gear on a second shaft, which extends parallel with a first rotating shaft of, for example, a cylinder. This permits the stable seating of the cylinder journal, and the planet gear can also be arranged on a side of the cylinder which is provided with a drive. If several rotating radial cover cams are provided, the arrangement of the associated planet wheel gears coaxially one behind the other is advantageous, since this permits a very compact structure.

If the planet wheel gear is designed as a "harmonic drive" gear, a particularly sensitive adjustment becomes possible, since these gears permit large gear reductions in a very small space. In addition, in comparison to a conventional planet wheel gear, for example, the rpm of the planet wheel are low and the contact ratio of the teeth is very great, which reduces wear.

It is furthermore advantageous, that the planet wheel gear, or respectively the "harmonic drive" gear, is driven by the drive unit of the cylinder, so that no additional drive means are necessary.

BRIEF DESCRIPTION OF THE DRAWINGS

The set of gears in accordance with the present invention is represented in the drawings and will be described in greater detail in what follows.

Shown are in.

DESCRIPTION OF THE PREFERRED EMBODIMENTS

Figure 1:
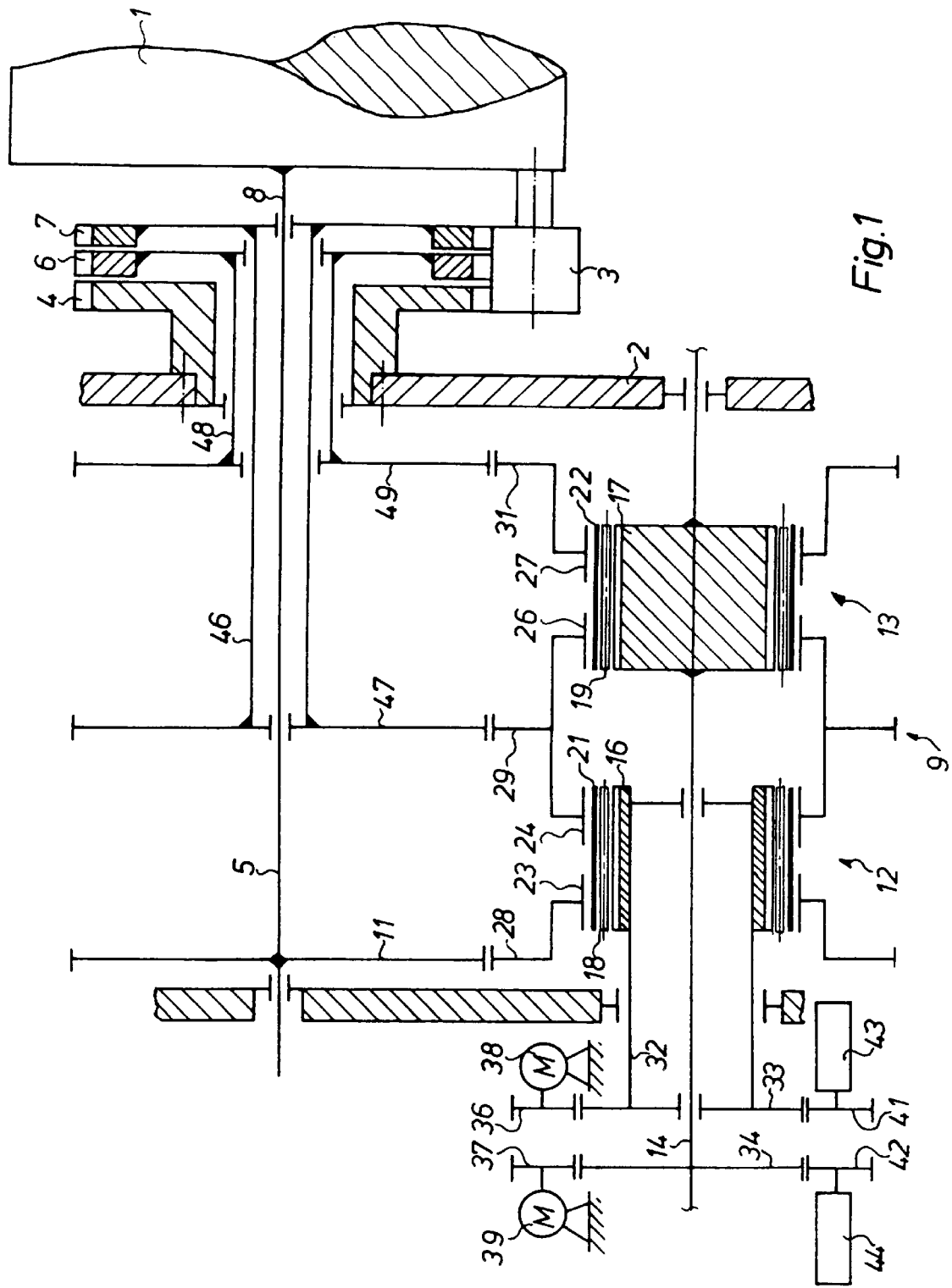
FIG. 1, a schematic representation of a collecting and folding cylinder with associated "harmonic drive" gears; and in FIG. 2, a schematic representation of the collecting and folding cylinder with associated planet wheel gears.

A collecting and folding cylinder 1, not represented in detail, for a folding apparatus of a rotary printing press is seated in lateral frames 2 and provided with processing tools, for example with point needles and folding blades, all known per se. These point needles and folding blades, which are arranged on shafts, are moved by means of cam rollers 3. The cam rollers 3 are controlled by rotating drive means such as, for example, radial cams 4, 6, 7. In place of the radial cams 4, 6, 7 and the cam roller 3 it is also possible to provide different rotating drive means, for example gear wheels.

In the present preferred embodiment, only the cam roller 3 and the cam disks 4, 6, 7 of the point needles are represented for the sake of simplicity. As in the present example, the cam roller and the cam disks can be arranged on the axially opposite ends of the collecting and folding cylinder 1 and can be and provided with an appropriate displacement gear. However, it is also possible to couple the cam disks 4, 6, 7 of the point needles and the folding blades and to arrange them together on one side of the collecting and folding cylinder 1.

In the preferred embodiment represented, one of the three radial cams 4, 6, 7 is designed as a base radial cam 4, which is fixed in place on the frame. The other two radial cams 6, 7 are designed as rotating radial cams 6, 7. This base radial cam 4 and the two rotating radial cams 6, 7 are seated coaxially in relation to a rotating shaft 5, i.e. to a cylinder journal 8 of the collecting and folding cylinder 1. The base radial cam 4 can also be placed into each of two different base positions, which are fixed on the frame during the operation, for producing a first transverse fold or a delta fold.

The radial cover cams 6, 7 are driven by a gear drive 9. It is possible, by means of this gear drive 9, to adjust the phase relation of each one of the radial cover cams 6, 7 with respect to the collecting and folding cylinder 1. The gear drive 9 is accordingly designed as a phase adjustment gear drive.

The drive of the gear drive 9 and of the collecting and folding cylinder 1 takes place by means of a cylinder drive gear wheel 11, which is connected, fixed against relative rotation, with the cylinder journal 8 and which has a diametrical pitch z11, for example z11=150.

In a first preferred embodiment, a planet wheel gear 12, 13, which is embodied as a "harmonic drive" gear 12, 13, is assigned to each radial cover cam 6, 7 in the gear drive 9. In respect to a shaft 14, these first and second "harmonic drive" gears 12, 13 are arranged coaxially one behind the other.

Essentially, each one of these first and second harmonic drives 12, 13 consists of an elliptic cam disk or "wave generator" 16, 17, with a flexible planet wheel 21, 22 or "flex spline" seated on cylinder rollers 18, 19, and with a diametrical pitch z21, z22, for example, z21, z22=160, and respectively two sun wheels 23, 24, 26, 27 supplied with internal teeth in the form of a "dynamic spline", or respectively a "circular spline".

A width b21, or respectively b22, of the flexible planetary gear 21, 22 has been selected such, that the flexible planet wheel or planetary gear 21, or respectively 22, simultaneously engages the associated sun wheels 23, 24, or respectively 26, 27.

The first sun wheel 23 with a diametrical pitch z23, for example z23=161 is connected in a torsion-proof manner with a first gear wheel 28, which meshes with the cylinder drive gear wheel 11 and which has a diametrical pitch z28, for example z28=99. The second sun wheel 24 with a diametrical pitch z24, for example z24=160, is connected with a second gear wheel 29 with a diametrical pitch z29, for example z29=88. The second "harmonic drive" gear 13 is driven by means of this second gear wheel 29, because of which this second gear wheel 29 is also simultaneously connected in a torsion-proof manner with the first sun wheel 26 with a diametrical pitch z26, for example z26=160, of the second "harmonic drive" gear 13. A third gear wheel 31 with a diametrical pitch z31, for example z31=88, is arranged on the second sun wheel 27 with a diametrical pitch z27, for example z27=161, of the second "harmonic drive" gear 13.

The cam disk 17 of the second "harmonic drive" gear 13 is connected in a torsion-proof manner with the phase adjustment gear drive shaft 14, which is rotatably seated in the lateral frame 2. A first end of the shaft 14 is seated in the lateral frame 2, and a second end of the shaft 14 is provided with a phase adjustment gear drive shaft gear wheel 34. A hollow shaft 32 is rotatably seated coaxially with the shaft 14, and the cam disk 16 of the first "harmonic drive" gear is fixedly arranged on a first end of hollow shaft 32, and a hollow shaft gear wheel 33 is fixedly arranged on its second end.

A first motor gear wheel 36, or respectively a second motor gear wheel 37 of a drive device, for example a first electric motor 38, or respectively a second electric motor 39, and a first position sensor gear wheel 41, or respectively a second position sensor gear wheel 42 of a first position sensor, for example a potentiometer 43, or respectively a second position sensor 44, respectively engage the gear wheel 33, or respectively 34.

A second cover cam hollow shaft 46 is seated, coaxially rotatable, on the cylinder journal 8 of the collecting and folding cylinder 1. On its first end, this hollow shaft is connected with the second cover cam 7, and on its second end with a second cover cam gear wheel 47 with a diametrical pitch z47, for example z47=161. The gear wheel 47 meshes with the second gear wheel 29, which is connected with the first and second sun wheels 24, 26 of the first harmonic drive gear 12. A first cover cam hollow shaft 48 is seated, independently rotatable and coaxially in respect to the second cover cam hollow shaft 46. The first cover cam 6 is arranged on a first end of the hollow shaft 48, and a first cover cam gear wheel 49 with a diametrical pitch z49, for example z49=160, on its second end. This gear wheel 49 meshes with the third gear wheel 31, which is connected with the second sun wheel 27 of the second "harmonic drive" gear 13.

The functioning of the phase adjustment gear drive 9 for the phase adjustment of cover cams 6, 7 is as follows:

The cylinder drive gear wheel 11, moved by means of a drive, not represented, drives the folding and collection cylinder 1 and, via the first gear wheel 28, the first sun wheel 23 of the first "harmonic drive" gear 12. This sun wheel 23 is in engagement with the first flexible planet wheel 21, which therefore rotates. In the course of the rotation, the first elliptical cam disk 16 elliptically deforms the first flexible planet wheel 21, which at the same time acts together with the second sun wheel 24, which has a diametrical pitch z24 slightly differing from the diametrical pitch z23 of the first sun wheel 23. A relative rotation of the first and second sun wheels 23, 24 of the first harmonic drive gear 12 is caused by this.

The second gear wheel 29 is driven by the second sun wheel 23 and simultaneously also drives the first sun wheel 26 of the second "harmonic drive" gear 13. This first sun wheel 26 also puts the second flexible planet wheel 22 into rotation.

Each flexible planet wheel 21, 22 is brought into engagement with its respective sun wheels 23, 24, or 26, 27 by means of a raised area of the associated cam disk 16, 17. This results in a "virtual" rotating shaft, located eccentrically in relation to the phase adjustment gear drive shaft 14. The two sun wheels 23, 24, or 26, 27 move relative to each other because of this deformation and rotation of the flexible planet wheels 21, 22.

The diametrical pitches of the respective gear wheel trains assigned to a cover radial cam 6, 7 are matched to each other in such a way, that a desired total gear ratio i6, or respectively i7, results. In the present exemplary embodiment, i6 equals i7 and is i6=i7=1.2 (i6=z28/z11*z24/z23*z47/z29= 99/150*160/161*161/88; i7=z28/z11*z24/z23*z27/ z26*z49/z31=99/150*160/161*161/160*160/88). However, any arbitrary values of the gear ratio are possible, for example, i6 and i7 can also have different values or can equal 1.

If a phase displacement of one of the two or of both radial cover cams 6, 7 with respect to the base radial cam 4 is required, for example for making a change from a first mode of operation "no collection" to a second mode of operation "collection" of the collecting and folding cylinder 1, each cam disk 16, 17 is rotated in the circumferential direction by means of its electric motor 38, or 39. Thus, the first sun wheel 23, 26 is relatively turned in respect to the second sun wheel 24, 27, and a phase change of the radial cover cam 6, 7 in relation to the base radial cam 4 is caused.

If the phase of the first radial cover cam 6 in the present example is changed, the second radial cover cam 7 is slightly changed along with it, since the two sun wheels 24, 26 are coupled by means of the second gear wheel 29. However, this slight phase change can be automatically compensated by means of a computer, which controls the electric motors 38, 39 and appropriately corrects the second electric motor 39.

Figure 2:
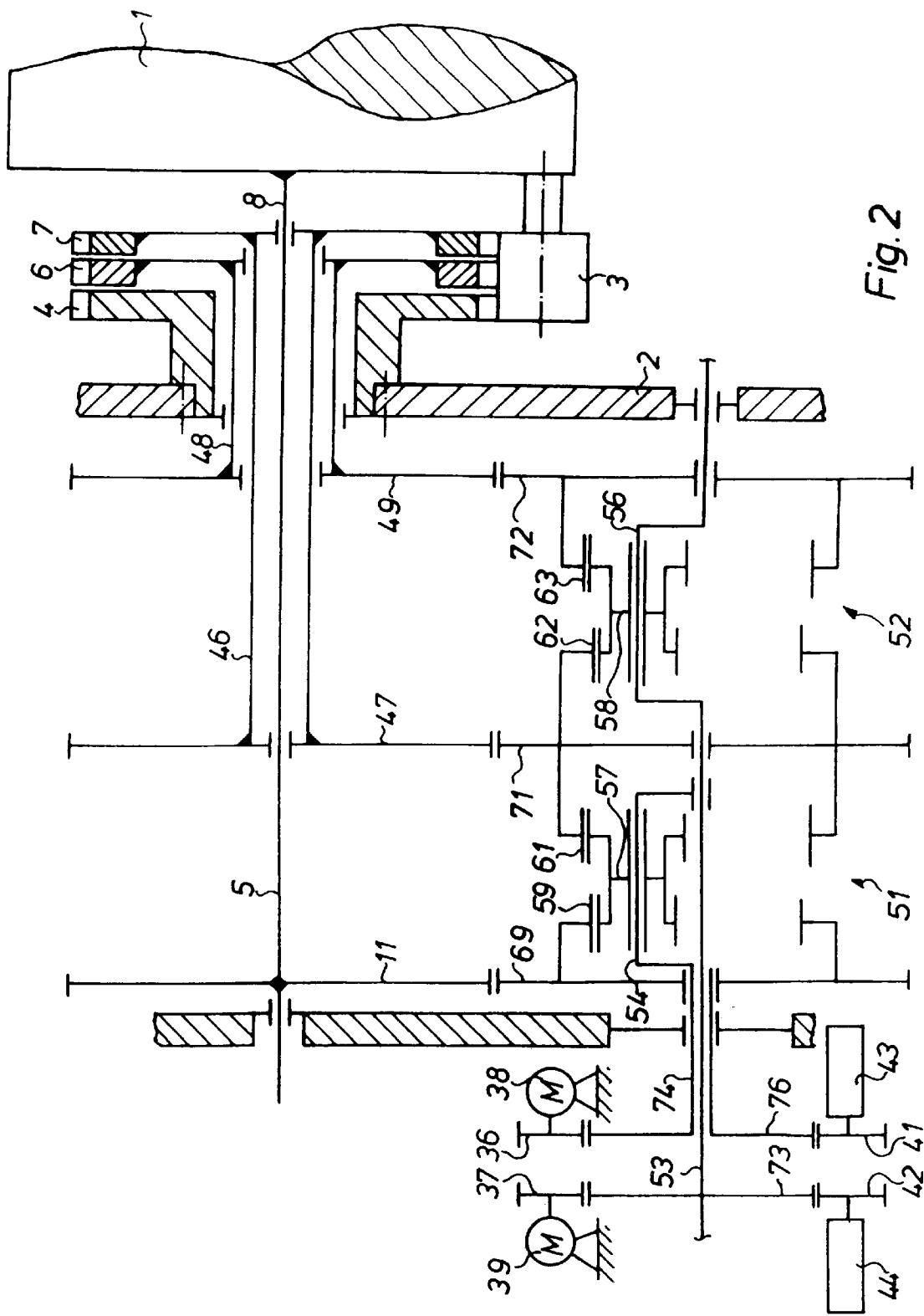

In a second preferred embodiment, as shown in FIG. 2, "conventional" first and second planet wheel gears 51, 52 have been provided in place of the "harmonic drive" gears 12, 13.

Here, too, the two planet wheel gears 51, 52 are arranged coaxially behind each other in relation to a planet wheel gear shaft 53. Essentially, each one of the two planet wheel gears 51, 52 respectively consists of an eccentric rotating shaft designed as rockers 54, 56 with a planetary wheel 57, 58 rotatably seated thereon, and first and second sun wheels 59, 61, or 62, 63, each provided with internal teeth.

The planetary wheels 57, 58, respectively, each having a diametrical pitch z57, for example z57=20, or respectively z58, for example z58=20, are provided with exterior teeth.

A width b57, or respectively b58 of each of the planetary wheels 57, 58 is designed in such a way, that the planetary wheels 57, or respectively 58, simultaneously mesh with the sun wheels 59, 61, or respectively 62, 63, which are possibly provided with the tooth correction.

The first sun wheel 59 with a diametrical pitch z59, for example z59=161 is connected in a torsion-proof manner with a first gear wheel 69 with a diametrical pitch z69, for example z69=99, which engages the cylinder drive gear wheel 11, and the second sun wheel 61 with a diametrical pitch z61, for example z61=160, is connected with a second gear wheel 71 with a diametrical pitch z71, for example z71=88. The second planet wheel gear 52 is driven by means of this second gear wheel 71, because of which this second gear wheel 71 is simultaneously connected in a torsion-proof manner with the first sun wheel 62 with a diametrical pitch z62, for example z62=160, of the second planet wheel gear 52. A third gear wheel 72 with a diametrical pitch z72, for example z72=88, is attached to the second sun wheel 63 with a diametrical pitch z63, for example z63=161, of the second planet wheel gear 52.

In accordance with the second preferred embodiment, the second and first cover cam gear wheels 47, 49 of the associated radial cover cams 6, 7 engage the second and third gear wheels 71, 72.

The rocker 56 of the second planet wheel gear 52 is connected in a torsion-proof manner with the planet wheel gear shaft 53, which is rotatably seated in the lateral frame 2. A first end of the shaft 53 is seated in the lateral frame 2, and a second end of the shaft 53 is provided with a gear wheel 73. A hollow shaft 74 is rotatably seated coaxially in relation to the shaft 53, at whose first end the rocker 54 of the first planet wheel gear 51, and at whose second end a hollow shaft gear wheel 76 is fixedly arranged.

Respectively one positioning drive, corresponding to the positioning drive described in connection with the first embodiment, acts together with the gear wheel 73, or respectively 76. The phase change of the radial cover cams 6, 7 takes place by rotating the desired rocker 54, 56 by means of the shaft 53, or respectively the hollow shaft 74 with the positioning drives 38 or 39 acting thereon.

In this way the phase change of the cover cams 6, 7 can take place continuously and without limitation.

This phase change is achieved in connection with the "harmonic drive" gears 12, 13, as well as with the "conventional" planet wheel gears 51, 52 in that a position of an engagement area can be changed in the circumferential direction by means of the otherwise stationary planet wheel 21, 22, or 57, 58 and the associated sun wheels 23, 24, 26, 27, or 59, 61, 62, 63. This is achieved by displacing the rocker 54, 56, or respectively the cam disk 16, 17 in the circumferential direction.

The gear ratio between the planet wheel 21, 22, or 57, 58 and the associated sun wheels 23, 24, or respectively 26, 27, or respectively 59, 61, or respectively 62, 63 is not equal to one.

The number of the planet wheel gears 12, 13, or 51, 52, which are arranged one behind the other, can be of any arbitrary size.

The drive of the planet wheel gears 12, 13, or 51, 52 is provided from the collecting and folding cylinder 1, for example by means of the cylinder drive gear wheel 11.

It is also possible to arrange planet wheel gears, or respectively "harmonic drive" gears, on several shafts, each of which extends parallel in relation to the rotating shaft 5 of the collecting and folding cylinder 1. In this case, their drive is provided by the cylinder drive gear wheel 11 of the collecting and folding cylinder 1.

While preferred embodiments of a set of gears in accordance with the present invention have been set forth fully and completely hereinabove, it will be apparent to one of skill in the art that a number of changes in, for example the drive for the cylinder, the type of cylinder being driven, and the like can be made without departing from the true spirit and scope of the present invention which is accordingly to be limited only by the following claims.

What is claimed is:

1. A gear assembly for adjusting a phase relationship between a plurality of rotating drive means supported coaxially with respect to each other on a rotating shaft, said gear assembly comprising:

a first planet wheel gear for driving a first one of the plurality of rotating drive means;

a second planet wheel gear for driving a second one of the plurality of rotating drive means;

a first planet wheel and first and second sun wheels forming said first planet wheel gear;

a second planet wheel and third and fourth sun wheels forming said second planet wheel gear;

actuating means for changing a position of engagement of said first and second sun wheels with said first planet wheel and for changing a position of engagement of said third and fourth sun wheels with said second planet wheel; and a second shaft, said second shaft extending parallel with the rotating shaft, said first and second planet wheel gears being arranged coaxially on said second shaft.

2. The gear assembly of claim 1 wherein each of said first, second, third and fourth sun gears has internal teeth and further wherein said first planet wheel simultaneously engages said first and sun wheels and said second planet wheel simultaneously engages said third and fourth sun wheels, each said first and second planet wheel gear having a gear ratio not equal to one.

3. The gear assembly of claim 1 wherein said second sun wheel of said first planet gear wheel is connected to said third sun wheel of said second planet gear wheel.

4. The gear assembly of claim 3 further including a drive means for one of the rotating drive means and wherein said second sun wheel is connected to said first sun wheel by said drive means.

5. The gear assembly of claim 1 further including a collecting and folding cylinder having radial cover cams, said radial cover cams forming the rotating drive means.

6. The gear assembly of claim 1 wherein said first planet wheel gear and said second planet wheel gear are each on a harmonic drive gear, each said harmonic drive gear including an elliptical cam disk, and a flexible planet wheel supported by said elliptical cam disk.

\* \* \* \* \*